Dec. 12, 1944.    K. E. SHAFFER    2,364,920
AUTOMATIC ARC STRIKING STARTER CIRCUIT
Filed Feb. 22, 1943
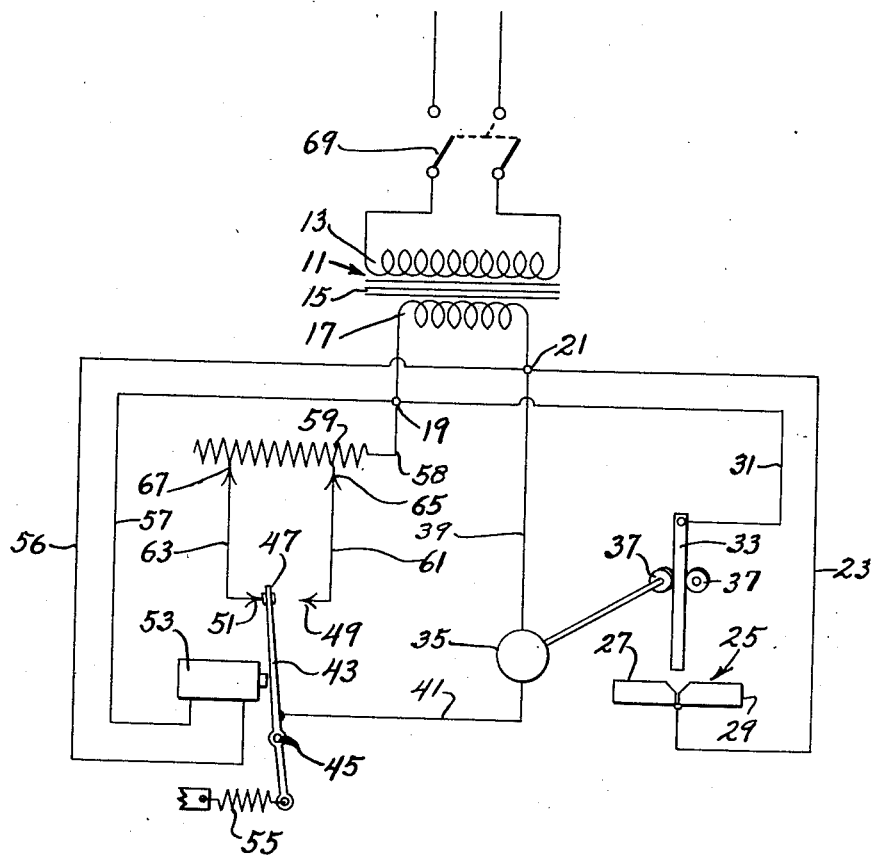
INVENTOR,
KENNETH E. SHAFFER.
BY
Chas. E. Townsend
ATTORNEY.

Patented Dec. 12, 1944

2,364,920

UNITED STATES PATENT OFFICE 2,364,920

AUTOMATIC ARC STRIKING STARTER CIRCUIT

Kenneth E. Shaffer, Richmond, Calif.

Application February 22, 1943, Serial No. 476,706

1 Claim. (Cl. 314—73)

This invention relates to welding, and more particularly to controlling the starting of the electric arc when automatic arc welding machines are used.

Such automatic machines have been in use to feed the electrodes which are consumed during the welding of the work in such a manner that the end of the electrode, while being consumed, remains at practically a fixed distance from the work in order to maintain the arc characteristics constant. The electrodes of the arc are the work itself and the "rod," which latter is the term ordinarily used by welders to designate the movable, consumable electrode. Constant arc characteristics are highly desirable and especially so when speed and uniformity in production are required.

Once the arc has been started, the work can progress smoothly. Difficulties are encountered in properly starting the arc because the arc electrodes must be in electrical contact with each other to start the current flow in the arc circuit, and because such contact must be broken in time to prevent welding of the consumable or movable electrode to the work. The only practical method used at all suitable in very large shipbuilding yards, where welding is done on a very large scale and where ships are produced in surprisingly large numbers in surprisingly short periods, is to place steel wool on the work, press the consumable or movable electrode upon the steel wool and then close the arc circuit. The heavy welding current dissipates the steel wool, leaving the rod spaced from the work and the arc results. This use of steel wool, however, is not a simple matter but requires, every time the arc is started, a high degree of skill on the part of the workman and much of his time.

Objects of this invention are to avoid the difficulties heretofore encountered in starting the arc properly; to avoid the necessity for great skill, use of much time and preparatory work in starting the arc properly; to make the proper starting of the arc practically fool-proof and possible by the mere throwing of an electric switch; to provide a simple circuit for the purpose; and other objects will become apparent on reading this specification in connection with the accompanying drawing which forms a part hereof.

The figure of the drawing is a diagrammatic illustration of a circuit involving my invention.

The sources of electric power for operating the arc and the motor to feed the rod as it is consumed toward the work are conventional and may be of any suitable type. A single source of supply for both is in conventional use. Alternating or direct current may be used in accordance with my invention. For the purpose of illustrating without limiting the invention, I refer to a source of power now generally in practical use, comprising a transformer 11, having a primary winding 13, a core 15 and a secondary winding 17. The welding transformer has terminals 19 and 21 for supplying the arc circuit with current. I connect two parallel circuits to these terminals. One of these circuits includes the feed motor and two selective branches, either of which, but only one at a time, is connected into the motor circuit, while the other circuit includes the arc. One of these terminals, as the terminal 21, is connected by the lead 23 to the work 25, comprising the members 27 and 29 to be welded together, while the other terminal 19 is connected by the lead 31 to the movable electrode or rod 33.

I prefer to use the type of feed motor which is in general use for the purpose, although other types may be used. Such a motor is shown diagrammatically at 35, the characteristics of which are well known, may be varied, and need not be described here. The motor conventionally actuates driving means, such, for example, as rollers 37 which, by their rotation, forward the rod 33 as it is melted or consumed to maintain the arc constant. One terminal of the motor is connected by a lead 39 to the terminal 21 of the source of power, for example, the secondary coil of the welding transformer. The other terminal of the motor is connected by a lead 41 to an electrical conducting arm 43, mounted to swing about a pivot point 45. The arm 43 or a contact element 47 thereon may contact either, but not both, of the contact elements 49 or 51 properly located for this purpose. A solenoid or relay magnet 53 and a tension spring 55, opposing the solenoid when it is operative, determine which of the contacts 49 or 51 is contacted by the contact 47. The ends of the winding of the solenoid are connected by leads 56 and 57 to the terminals 21 and 19, respectively. Thus, as illustrated in the drawing, I have shown three circuits in parallel fed by common terminals 19 and 21.

A lead 58 connects the terminal 19 of the source of power to a resistance or impedance 59. Leads 61 and 63, connected, respectively, to the contact elements 49 and 51, contact the resistance or impedance, respectively at different points 65 and 67 thereon. These points of contact, or either of them alone, may be fixed if the values have been predetermined and are not to be changed; or they may, either one or both, be variable to provide for adjustment. As will be seen from the drawing, there will be less resistance or impedance in series with the feed motor 35 when the contacts 47 and 49 are together than when the contacts 47 and 51 are together.

A switch 69 is provided to make and break the connection of my circuit to the source of power, and this may be the transformer switch which controls the connection between the power line and the primary winding 13 of the transformer 11, or it may be otherwise suitably located.

The operation is as follows: With the switch 69 open, the solenoid 53 is inoperative and the spring 55 holds the contact 47 against the contact 49. All that is necessary to set the circuit in operation is to close the switch, whereupon operation becomes completely automatic. On closing the switch 69, the solenoid 53 immediately is energized and causes the contact 47 to move and be held against the contact 51, thus putting the relatively larger resistance or impedance value (between the lead 58 and the contact point 67) into series with the feed motor and causing the application of less power to the feed motor than if less resistance or impedance were in use. The rod is moved slowly against the work by the motor and touches it only lightly and avoids any chance of the rod being welded or frozen to the work. The arc is started as soon as the rod touches the work and this causes a drop in potential across the terminals 19 and 21, namely, the potential applied to the solenoid 53, which thus becomes unable to hold the arm 43 against the pull of the spring 55. This drop in potential, due to striking the arc, is considerable with transformers for use in welding, many of such transformers having an open voltage, that is, before the arc is struck, of about eighty volts across the terminals 19 and 21 which drops to less than about thirty volts while the arc is operating.

This spring 55 thus causes the contact member 47 to leave the contact member 51 and to touch the contact member 49 and hold it there. Thus, as soon as the arc has been started, there will be less resistance or impedance (between the lead 58 and the contact point 65) in series with the feed motor and it will run faster and feed the rod faster, at the speed required for welding. The arm does not move on de-energizing the circuit by opening the switch 69. The values of the various parts are to be so chosen that the operation will be as just described.

The motor 35 need not necessarily be electrically driven since any type of motor, or means to feed the rod 33, will be useful, provided it be controlled as to the speed of feed of the rod by the control circuit. I have referred to certain other details also for the purpose only of describing the invention which is to be limited only by the scope of the appended claim.

I claim:

In an electric arc welding system including terminals leading from a source of electric power the combination comprising a welding circuit, an electrode feed rate control circuit and a starting circuit, said welding circuit comprising a movable electrode connected to one of said power source terminals and a lead to the work to be welded, the voltage potential across said power source terminals being greater when said welding circuit is not completed than when current is passing therethrough, said electrode feed rate control circuit comprising an electric motor connected to said power source terminals through a double throw switch member and adapted to constantly move said movable electrode towards said work when said welding circuit is completed, said starting circuit comprising a resistance, said double throw switch member, a lead from one of said power source terminals to said electric motor, a lead from said electric motor to said double throw switch and a contact lead from said resistance to said double throw switch and forming a parallel circuit through said power source terminals, resistance, double throw switch and electric motor when said double throw switch is in starting position, whereby said electric motor operates at reduced speed when said double throw switch is in starting positiion, solenoid means adapted to move said double throw switch to starting position when said welding circuit is not completed and maximum voltage potential across said power source terminals exists and means adapted to move said double throw switch against the action of said solenoid means to complete said electrode feed control circuit when said welding circuit is completed and said voltage across said power source terminals is accordingly reduced.

KENNETH E. SHAFFER.